(12) United States Patent
Goad

(10) Patent No.: US 7,737,889 B1
(45) Date of Patent: Jun. 15, 2010

(54) METHOD AND APPARATUS FOR PROCESSING GLOBAL NAVIGATION SATELLITE SYSTEM SIGNALS

(75) Inventor: Clyde C. Goad, Columbus, OH (US)

(73) Assignee: Topcon GPS, LLC, Oakland, NJ (US)

( * ) Notice: Subject to any disclaimer, the term of this patent is extended or adjusted under 35 U.S.C. 154(b) by 1028 days.

(21) Appl. No.: 11/473,354

(22) Filed: Jun. 22, 2006

Related U.S. Application Data

(60) Provisional application No. 60/693,744, filed on Jun. 24, 2005.

(51) Int. Cl.
G01S 19/54 (2010.01)
(52) U.S. Cl. .............................. 342/357.12; 342/357.06
(58) Field of Classification Search ............ 342/357.12, 342/357.06, 357.11
See application file for complete search history.

(56) References Cited

U.S. PATENT DOCUMENTS

| 5,963,167 | A | | 10/1999 | Lichten et al. |
|---|---|---|---|---|
| 6,061,631 | A | * | 5/2000 | Zhang .................... 342/357.04 |
| 6,295,021 | B1 | | 9/2001 | Lichten et al. |
| 6,934,632 | B2 | | 8/2005 | Hatch |
| 2005/0080560 | A1 | | 4/2005 | Hatch |
| 2006/0125686 | A1 | | 6/2006 | Deimert et al. |
| 2007/0057839 | A1 | * | 3/2007 | Kagawa ................. 342/357.04 |

OTHER PUBLICATIONS

U. Vollath et al., Analysis of Three-Carrier Amgibuity Resolution (TCAR) Technique for Precise Relative Positioning in GNSS-2, ION GPS, p. 417-426, 1998.*
J. Jung, Optimization of Cascade Integer Resolution with Three Civil GPS Frequencies, ION GPS, p. 2191-2200, Sep. 2000.*
H. Isshiki, An Application of Wide-Lane to Long Baseline GPS Measurements (3), ION GPS, 2003.*
D. Kim et al., On ultrahigh-precision GPS positioning and navigation, Navigation, vol. 50(2), p. 103-116, Summer 2003.*

* cited by examiner

*Primary Examiner*—Thomas H Tarcza
*Assistant Examiner*—Fred H Mull
(74) *Attorney, Agent, or Firm*—Wolff & Samson PC

(57) ABSTRACT

Disclosed is a receiver that receives at least three satellite signals and determines the contribution of dispersive elements, nondispersive elements, and phase windup to a phase difference between each received satellite signal and a corresponding generated signal.

24 Claims, 4 Drawing Sheets

METHOD AND APPARATUS FOR PROCESSING GLOBAL NAVIGATION SATELLITE SYSTEM SIGNALS

This application claims the benefit of U.S. Provisional Application No. 60/693,744 filed Jun. 24, 2005, which is incorporated herein by reference.

BACKGROUND OF THE INVENTION

The present invention relates generally to signal processing, and more specifically to processing global navigation satellite system signals.

In the processing of global navigation satellite system (GNSS) data, two basic types of measurements are typically used to determine the position of a satellite receiver. One type of measurement is using a coded time mark of the transmission time of satellite signals. The other type of measurement is a phase (difference) measurement, the difference between the phase generated by the satellite oscillator at transmission time and the phase in the receiver's oscillator at receipt time.

With respect to the first type of measurement, a receiver receives signals transmitted by a satellite and, if needed, decodes the signals. Once decoded, the transmission time of the signals are compared to a received time of the signals determined by the receiver. The difference between the received time and the transmitted time is then multiplied by the vacuum speed of light to yield a pseudorange observation.

Along with the transmission time, tables of satellite ephemeris parameters are also typically transmitted by the satellite. With the satellite ephemeris parameters and pseudoranges from a minimum of four satellites, the location of a receiver at or near the earth's surface can be determined. The location is typically accurate to within several meters and often depends on the quality of the geometrical distribution of satellites and the number of satellites.

As described above, the other type of measurement used is phase measurement. The phase measurement is typically the measured difference between the carrier's phase state at transmission time and the phase state of the receiver at reception time. The difference is usually measured in the receiver's hardware utilizing a phase locked loop (PLL).

The precision typically considered for the PLL-based measurements is typically on the order of 0.01 cycles. The wavelengths of GNSS signals (having frequencies identified by identifiers $L_1$ and $L_2$) are approximately 19 and 24 cm, respectively. The expected quality, or accuracy, of the $L_1$ and $L_2$ phase measurements is approximately 2 mm, using the 0.01 cycle expectation.

The increase in phase measurement accuracy over pseudorange accuracy, however, occurs at a price. While pseudoranges are biased by the receiver's clock error, phase measurements are biased by initial phase offset values and an arbitrary cycle count (integer) (i.e., cycle ambiguity). While changes from epoch to epoch in phases are unambiguous as long as a lock on the phase signals is maintained, absolute phase values contain an unchanging ambiguity.

Because the accuracy associated with phase measurements (i.e., typically millimeter accuracy) is more appealing for use in precise positioning applications, there remains a need to utilize these phase measurements better.

BRIEF SUMMARY OF THE INVENTION

In accordance with the principles of the present invention, a receiver receives at least three satellite signals and determines the contribution of dispersive elements, nondispersive elements, and phase windup to a phase difference between each received satellite signal and a corresponding generated signal.

Specifically, the receiver receives at least three signals from a satellite, with each signal having a different frequency and a phase. In one embodiment, the receiver measures the phase of each received signal. The receiver also generates three signals. Each of the generated signals has a frequency that corresponds with one of the frequencies of the received signals. Each generated signal also has a phase. The receiver then determines a phase difference between the phase of each received signal and the phase of each generated signal. Once the phase differences are determined, the receiver can determine the contributions of dispersive elements, nondispersive elements, and phase windup to each of the phase differences.

The contributions of each are important and help determine additional information about the satellite and/or receiver. In particular, dispersive elements include components relating to the ionosphere. Nondispersive elements include components relating to position, clock state, and troposphere. Phase windup includes a rotational component for the satellite and a rotational component for the receiver.

The known contributions can often facilitate the determination of specific unknown contributions. For example, if the position and troposphere components of the nondispersive elements are known, then the clock state can be determined.

A multipath component may also affect the phase differences. As the multipath component is usually small, the multipath component may be ignored during the determination of the different contributions to the phase differences.

These and other advantages of the invention will be apparent to those of ordinary skill in the art by reference to the following detailed description and the accompanying drawings.

DETAILED DESCRIPTION

Figure 1:
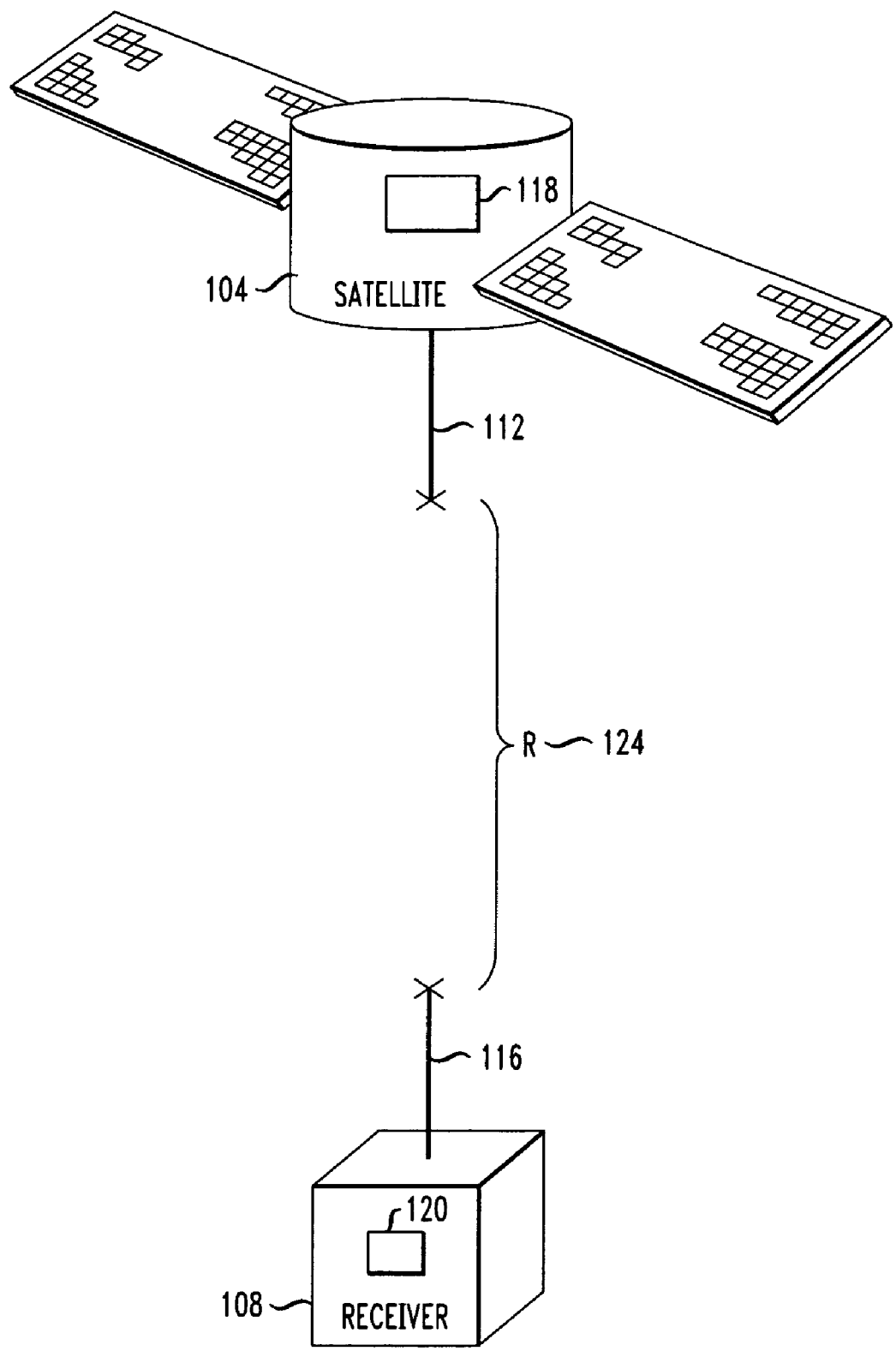
FIG. 1 is a block diagram of a satellite communicating with a receiver via a single frequency.

FIG. 1 is a block diagram of a single frequency satellite 104 communicating with a single frequency ground receiver 108. The satellite 104 has a transmitting antenna 112, such as a dipole antenna, pointed toward the Earth for transmitting signals (i.e., sine waves) to the receiver 108. The satellite 104 has an oscillator 118 to generate the signals transmitted to the receiver 108.

The receiver 108 has a receive antenna 116, such as a dipole antenna, pointed upward toward the sky for receiving the signals transmitted by the satellite 104. Further, the receiver 108 generates its own signals and includes an oscillator 120 to generate these signals.

The equation representing the phase of the signal generated by the satellite's oscillator 118 (and transmitted by the satellite 104) is as follows:

$$f_s t + \phi_0^s$$

where $f_s$ is the frequency of the signal generated by the satellite oscillator 118, t is the time, and $\phi_0^s$ is the phase of the satellite signal at a reference time.

The distance between the satellite 104 and the receiver 108 is R 124. At the receiver 108, the phase of the signal received by the receiver antenna 116 is denoted by:

$$f_s\left(t - \frac{R}{c}\right) + \phi_0^s$$

where $$\frac{R}{c}$$

denotes the travel time between the satellite 104 and the receiver 108 (where c is the vacuum speed of light).

The receiver 108 generates a signal that has a phase denoted by:

$$f_R t + \phi_0^R$$

where $f_R$ is the frequency of the signal generated by the receiver oscillator 120, t is the time, and $\phi_0^R$ is the phase of the receiver signal at a reference time.

The receiver 108 receives the signal from the satellite 104 and determines the phase difference between the received signal and the signal generated by its oscillator 120. Assuming the frequency $f_s$ is the same as $f_R$ (i.e., $L_1$), the phase difference $\Delta\phi_1$ for a first frequency $L_1$ between the two signals is given as follows:

$$\Delta\phi_1 = f\frac{R}{c} - \phi_0^s + \phi_0^R$$

Thus, as R changes, the phase difference changes.

The following equations are more detailed equations representing the above equations. For example, in the following equations, it is not assumed that frequency $f_s$ is the same as $f_R$.

$$\varphi_{k,1}^p = \frac{f_1}{c}\rho_k^p(\bar{t}^p) + N_k^p(1) - f_1 dt_k +$$

$$f_1 d\bar{t}^p - I_{k,1,\varphi}^p(t_k) + \frac{f_1}{c}T_k^p(t_k) + \delta_{k,1,\varphi}^p(t_k) + \varepsilon_{1,\varphi}$$

$$\delta_{k,1,\varphi}^p(t_k) = d_{k,1,\varphi}(t_k) + d_{k,1,\varphi}^p + d_{1,\varphi}^p(t_k)$$

Each subscript identifies the receiver (i.e., a receiver ID) while each superscript identifies the satellite (i.e., a satellite ID). The number 1 represents the first frequency (i.e., $L_1$). The variable in the above equations are defined as follows:

ϕ—the phase difference between the received and generated signals

ρ—the distance between the satellite (p) and the receiver (k) (i.e., R);

t—the time (at satellite p);

N—the ambiguity;

dt—the error in the time (at the receiver oscillator or clock $dt_k$ or at the satellite oscillator or clock $dt^p$);

f—frequency;

I—ionospheric effect;

T—troposphere effect;

δ—an accumulation of errors (e.g., multipath or satellite biases); and

ε—noise.

Figure 2:
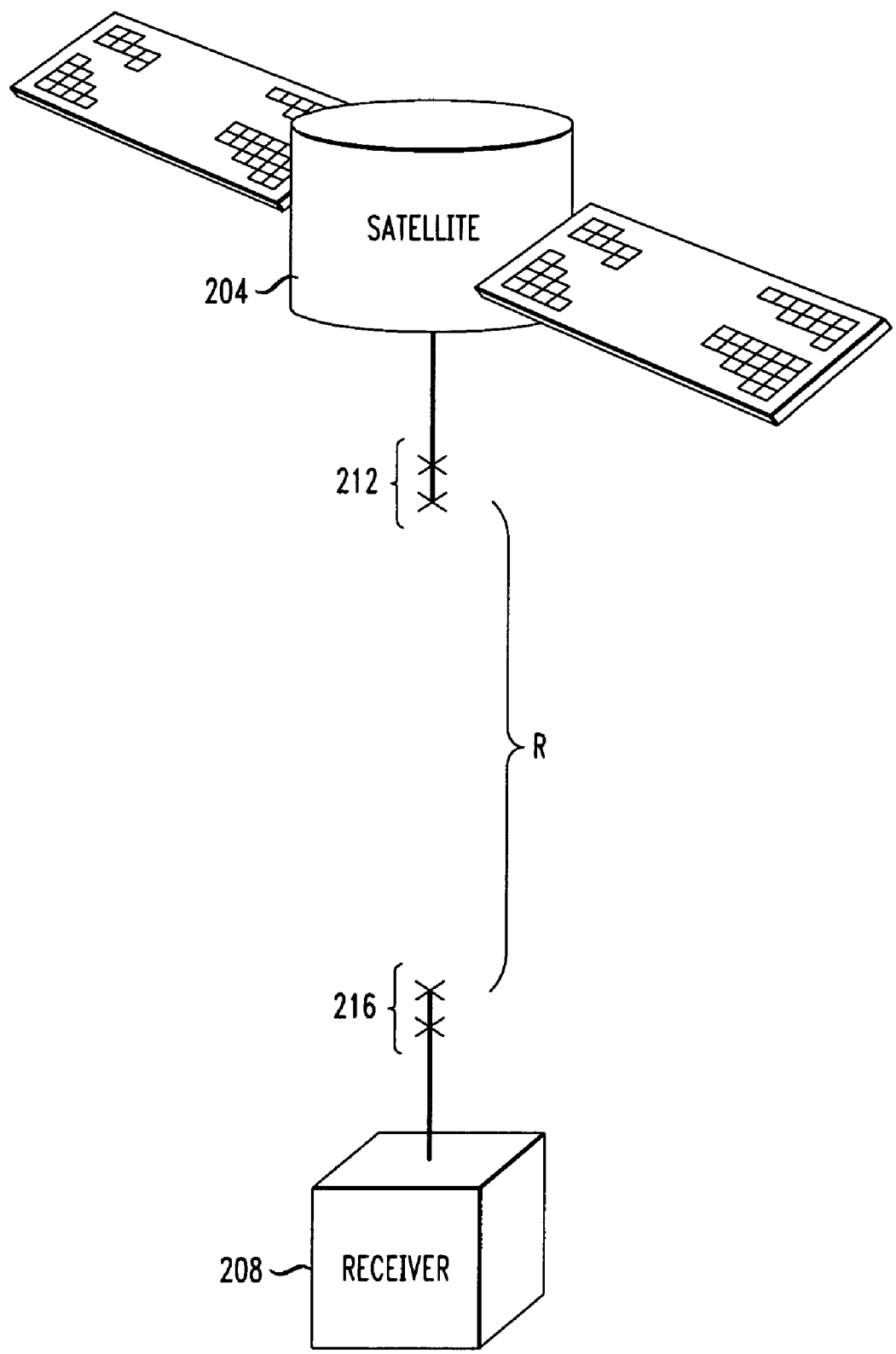
FIG. 2 is a block diagram of a satellite communicating with a receiver via two frequencies.

FIG. 2 shows a block diagram of a dual frequency satellite 204 communicating with a dual frequency receiver 208. The satellite 204 has two antennas (e.g., shown as dipole antennas) 212 and the receiver 208 also has two antennas (e.g., shown as dipole antennas) 216. Thus, the satellite transmits two signals, each at a different frequency ($L_1$ and $L_2$).

The receiver 208 receives the signals using its two antennas 216 and also generates two signals at frequencies corresponding to the received signals' frequencies. Although not shown, the satellite and receiver have an oscillator to generate the signals as described above. The receiver 208 then determines the phase difference for each frequency as follows:

$$\Delta\phi_1 = f_1\frac{R}{c} - \phi_{1_0}^s + \phi_{1_0}^R \quad \text{(for } L_1\text{)}$$

$$\Delta\phi_2 = f_2\frac{R}{c} - \phi_{2_0}^s + \phi_{2_0}^R \quad \text{(for } L_2\text{)}$$

The satellite can also send a third signal having a third frequency (often denoted by $L_5$). Thus, in yet another embodiment, the satellite (e.g., satellite 204) and receiver (e.g., receiver 208) each have a third antenna (e.g., shown as a dipole antenna). The satellite transmits (and the receiver receives) three signals. In this scenario, the phase differences computed by the receiver are denoted by:

$$\Delta\phi_1 = f_1\frac{R}{c} - \phi_{1_0}^s + \phi_{1_0}^R \quad \text{(for } L_1\text{)}$$

$$\Delta\phi_2 = f_2\frac{R}{c} - \phi_{2_0}^s + \phi_{2_0}^R \quad \text{(for } L_2\text{)}$$

$$\Delta\phi_5 = f_5\frac{R}{c} - \phi_{5_0}^s + \phi_{5_0}^R \quad \text{(for } L_5\text{)}$$

The phase difference for each frequency (i.e., for $L_1$, for $L_2$, and for $L_5$) are constant (assuming no change in R). As stated above, the phase differences change when the distance R between the satellite and the receiver changes, such as if the satellite moves further away from the receiver.

Figure 3:
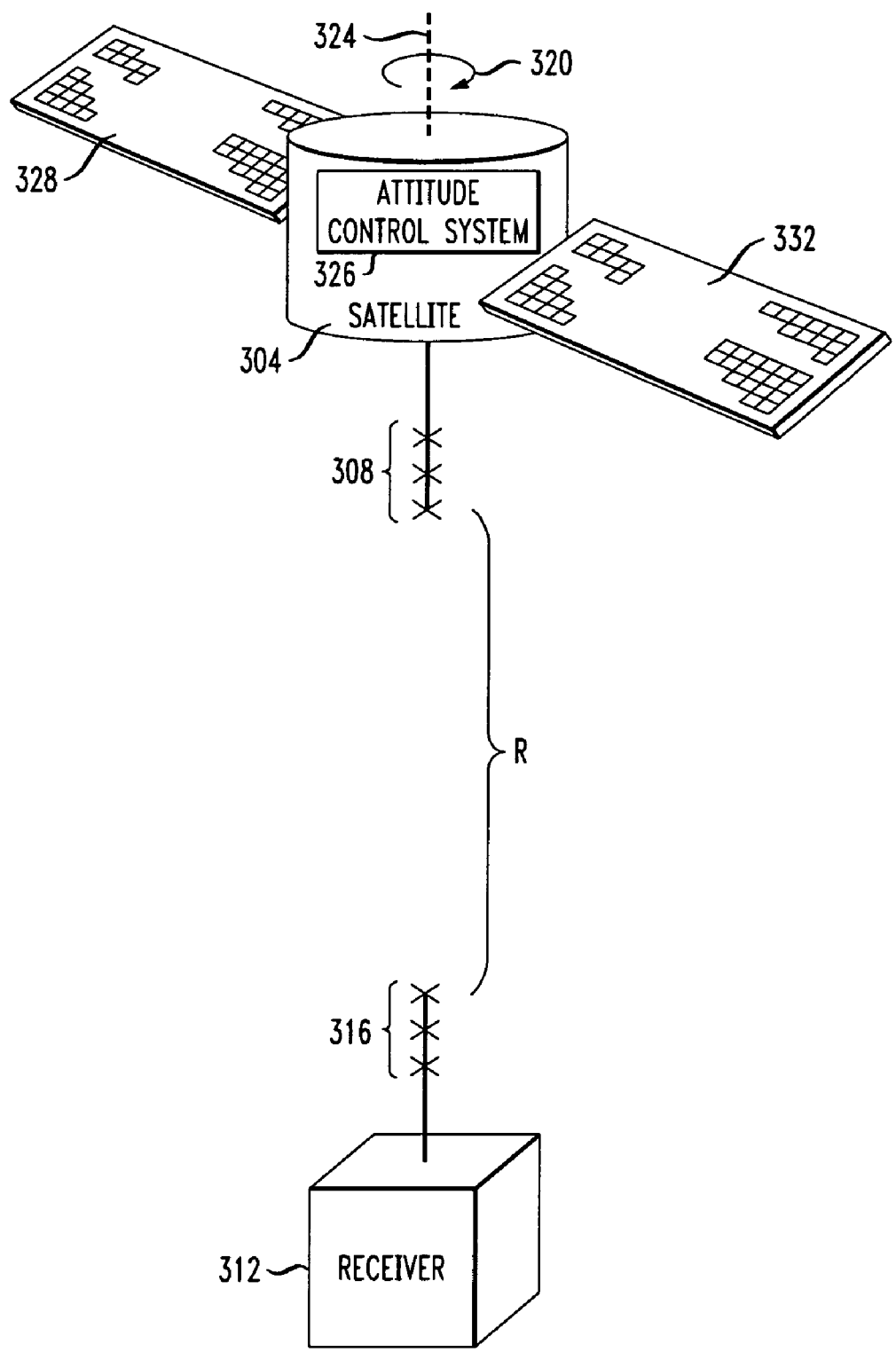
FIG. 3 is a block diagram of a satellite communicating with a receiver via three frequencies.

FIG. 3 is a block diagram of a three frequency satellite 304 with three transmitting antennas 308 communicating with a three frequency receiver 312 having three receiving antennas 316. The satellite 304 transmits and the receiver 312 receives signals having a first frequency $L_1$, a second frequency $L_2$, and a third frequency $L_5$. Although not shown, the satellite and receiver have an oscillator (or more than one oscillator) to generate the signals as described above. In FIG. 3, however, the satellite 304 rotates (shown with arrow 320) about its axis 324 (i.e., its boresight axis).

In this scenario, because the satellite antennas 308 are rotating with respect to the receiver antennas 316, the phase differences change even if R remains constant. Every time the satellite 304 rotates 360 degrees, $\Delta\phi_1$, $\Delta\phi_2$, and $\Delta\phi_5$ change by one cycle. The phase differences can now be written as follows:

$$\Delta\phi_1 = f_1 \frac{R}{c} - \phi_{1_0}^s + \phi_{1_0}^R + wu \quad \text{(for } L_1\text{)}$$

$$\Delta\phi_2 = f_2 \frac{R}{c} - \phi_{2_0}^s + \phi_{2_0}^R + wu \quad \text{(for } L_2\text{)}$$

$$\Delta\phi_5 = f_5 \frac{R}{c} - \phi_{5_0}^s + \phi_{5_0}^R + wu \quad \text{(for } L_5\text{)}$$

where wu represents the phase windup resulting from the relative rotation between the satellite 304 and the receiver 312. Although FIG. 3 shows the satellite 304 as rotating, the phase windup occurs when either the satellite 304 and/or the receiver 312 rotate about the boresight axis. For example, if the receiver 312 is rotated by a surveyor, the receiver's rotation contributes to the phase windup.

The satellite 304 also has an attitude control system 326 and panels 328, 332. The attitude control system 326 controls the attitude of the satellite 304. The attitude control system 326 tries to keep the panels 328, 332 pointed towards the sun as the satellite 304 moves. The attitude control system 326 also tries to keep its antennas 308 pointed toward the center of the Earth (i.e., the nadir) as the satellite 304 moves. Because of these adjustments made by the attitude control system 326, the satellite 304 has a small rotation throughout its orbit.

In more detail, the equations below depict the expected phase windup from anticipated satellite motions. These equations describe how the satellite 304 is oriented relative to the Earth. With respect to these equations, assumptions about the effects of the attitude controls of the satellite are made (e.g., that the attitude control system is working properly).

$$d = \hat{x} - k(k \cdot \hat{x} + k \times \hat{x})$$

$$d' = \hat{x}' - k(k \cdot \hat{x}') + k \times \hat{x}'$$

$$\delta\varphi = \text{sign}[k \ (d \times d)] \cos^{-1}\left(\frac{d' \cdot d}{|d||d|}\right)$$

In the above equations, δφ corresponds to the expected one-way phase windup variation due to satellite antenna motion, and unprimed variables x̂ and x̃ refer to the unit vectors in the dipole directions in the receiving (ground) antennas. Typically, these point to the east and north directions. Primed variables refer to satellite-based unit vectors along equivalent dipole directions. As described above, the satellite local transmission axis, or z̃′ axis, should be pointed toward the nadir, one of the satellite dipole axes toward the sun, and the receiving antenna with the axes pointing in the east, north, up directions. k is a vector from the satellite to the receiver.

There are, however, times when the GNSS satellite experiences an eclipse, and the controls are no longer able to orient the satellite as defined. In this case, the windup can be used to obtain a better understanding of what the satellite is doing. In other words, the windup can be used to determine what effect the satellite is having on the phase measurements during an eclipse.

Multipath may also be present in the system shown in FIG. 3. Multipath is present when the direct signal phase is contaminated by a reflected component. The amount of contamination is governed by the reflectivity coefficient α. The variation in measured phase due to multipath reflections is referred to below as ψ:

$$\psi(\lambda) = \tan^{-1}[\alpha \sin\theta(\lambda)/(1+\alpha\cos\theta(\lambda))]$$

where $\theta(\lambda) = (4\pi h/\lambda)\sin\delta$, h being the distance from the reflecting surface, λ the carrier wavelength, δ the satellite elevation above the reflecting (planar) surface, and α the reflectivity coefficient, the fractional amount of signal reflection (a number in the range [0,1]). When the value of α is at its maximum (1.0), the resulting error in measured phase is ¼ of a cycle. Note in the above that ψ is a function of transmission frequency (or equivalently transmission wavelength).

Although the mathematical structure of multipath is known, the problem with modeling multipath is that the reflectivity coefficient can change rapidly as the reflection point changes due to satellite geometry changes. Also, the effective height or distance away from the reflecting surface is unknown and can change. Thus, with a changing distance to a reflecting surface and also a varying α, it is often difficult to predict multipath contamination.

Although difficult to predict, multipath can be identified when it occurs. Since instances of multipath corruption do not typically occur on all channels (satellites) at the same time with the same reflectivity coefficient, systematic residual patterns can be compared to identify a typical period of growth and then decay. This growth and decay typically indicates that multipath is present in one satellite (or more than one satellite). In one embodiment, these periods are 107 minutes for nearby reflectors (e.g., 30 cm away) and 3.2 minutes for reflectors 10 meters away. Typically, multipath signatures are detected in data with periods of a few seconds for very distant reflectors to 8 minutes for the closer reflectors.

Detecting multipath signatures in data is often more difficult for receivers that are moving as opposed to stationary receivers. When moving, the multipath will be much more random as the coefficient and point of reflection change rapidly.

The relationships given above can be summarized as follows:

$$\varphi_{k,1}^p = \frac{f_1}{c}\rho_k^p(t^p) + N_k^p(1) - f_1 dt_k + f_1 dt^p -$$

$$I_{k,1,\varphi}^p(t_k) + \frac{f_1}{c}T_k^p(t_k) + \delta_{k,1,\varphi}^p(t_k) + \delta\varphi_{k,1}^p + \psi(\lambda) + \varepsilon_{1,\varphi}$$

$$\delta_{k,1,\varphi}^p(t_k) = d_{k,1,\varphi}(t_k) + d_{k,1,\varphi}^p + d_{1,\varphi}^p(t_k)$$

Here, the addition of the δφ term is to account for the impact on one-way phase data for the windup and ψ(λ) for multipath.

If the satellite 304 is moved away from or toward the receiver 312, then, due to right circular polarization, the phase counts up or down, depending on the direction of motion, by one cycle for every wavelength the satellite 304 moves toward or away from the receiver 312.

As described above, another way to create a phase change is to rotate the antenna so that a change in orientation of one cycle changes the measured phase difference by the same one cycle. If the receiver only had the single frequency capability, one could not distinguish between a change in distance of one wavelength or a rotation of transmitter (or receiver) of one turn.

If more frequencies are available, however, then the above described motions would create a different response at the different frequencies. Windup exhibits itself as the same response in terms of cycles in all the measurements, and distance changes cause a different response in terms of cycles. Further, because dispersive contributions, such as contributions associated with the ionosphere, are inversely proportional to the square of the frequency, a minimum of two frequencies are traditionally used to separate these contributions (note there is a sign difference between dispersive ionospheric effects between phases and pseudoranges, however the noise in the pseudorange is the limiting factor).

Figure 4:
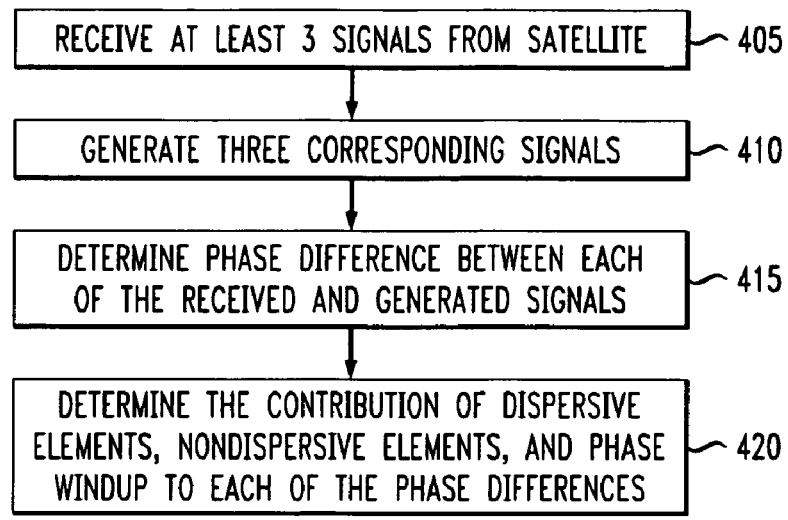
FIG. 4 is a flowchart showing the steps performed by a receiver in accordance with an embodiment of the present invention.

FIG. 4 shows a flowchart illustrating the high level steps performed by a satellite receiver in accordance with an embodiment of the present invention.. The receiver first receives at least three signals from a satellite in step 405. Each signal has a frequency and phase, and each signal has a different frequency than the other signals (i.e., $L_1$, $L_2$, and $L_5$). The receiver also (either before, during or after receipt of the satellite signals) generates three signals in step 410, each having a frequency and phase. The frequency of each generated signal corresponds with the frequency of one of the received signals. In one embodiment, each of the generated signals has approximately the same frequency (i.e., $L_1$, $L_2$, and $L_5$) as the received signals.

The receiver then determines a phase difference between each of the receives signals and the corresponding generated signals in step 415. The receiver then determines the contribution of dispersive elements, nondispersive elements, and phase windup to each of the phase differences in step 420.

In order to simplify the discussion, here the above formulation is differenced in time to highlight those terms that change.

$$\Delta\varphi_{k,1}^p = \frac{f_1}{c}\Delta\rho_k^p(\hat{t}^p) - \Delta I_{k,1,\varphi}^p(t_k) + \Delta\delta\varphi_k^p + \Delta\psi(\lambda) + \Delta\varepsilon_{1,\varphi}$$

The above equation is rewritten in terms of distances by multiplying each term by the wavelength of transmission or $\lambda_1$ corresponding to the $L_1$ transmission frequency.

$$\Delta\Phi_{k,1}^p = \Delta\hat{\rho}_k^p(\hat{t}^p) - \lambda_1\Delta I_{k,1,\phi}^p(t_k) + \lambda_1\Delta\delta\Phi_k^p + \lambda_1\Delta\psi(\lambda_1) + \lambda_1\Delta\varepsilon_{L,\phi}$$

Thus, $\Phi = \phi\lambda$. Similar expressions can be generated for other frequencies. Here it is assumed that the two additional frequencies are $L_2$ and $L_5$ with $\beta = (f_1/f_2)^2$ and $\Gamma = (f_1/f_5)^2$:

$$\Delta\Phi_{k,2}^p = \Delta\hat{\rho}_k^p(\hat{t}^p) - \lambda_2\Delta\beta I_{k,1,\phi}^p(t_k) + \lambda_2\Delta\delta\Phi_k^p + \lambda_2\Delta\psi(\lambda_2) + \lambda_2\Delta\varepsilon_{L,\phi}$$

$$\Delta\Phi_{k,5}^p = \pm\Delta\hat{\rho}_k^p(\hat{t}^p) - \lambda_5\Delta\Gamma I_{k,1,\phi}^p(t_k) + \lambda_5\Delta\delta\Phi_k^p + \lambda_5\Delta\psi(\lambda_5) + \lambda_5\Delta\varepsilon_{L,\phi}$$

Ignoring the noise or error terms, the above results in the following three equations with four unknowns:

$$\Delta\Phi_{k,1}^p = \Delta\hat{\rho}_k^p(\hat{t}^p) - \lambda_1\Delta I_{k,1,\phi}^p(t_k) + \lambda_1\Delta\delta\Phi_k^p + \lambda_1\Delta\psi(\lambda_1)$$

$$\Delta\Phi_{k,2}^p = \Delta\hat{\rho}_k^p(\hat{t}^p) - \lambda_2\Delta\beta I_{k,1,\phi}^p(t_k) + \lambda_2\Delta\delta\Phi_k^p + \lambda_2\Delta\psi(\lambda_2)$$

$$\Delta\Phi_{k,5}^p = \pm\Delta\hat{\rho}_k^p(\hat{t}^p) - \lambda_5\Delta\Gamma I_{k,1,\phi}^p(t_k) + \lambda_5\Delta\delta\Phi_k^p + \lambda_5\Delta\psi(\lambda_5)$$

These three equations show the four contributions to a phase measurement—the distance $\rho$ (i.e., between the satellite and the ground receiver), the mathematical relationship due to the ionosphere I (i.e., for the different frequencies, the ionosphere effect is different), the phase windup $\delta\Phi$ (which behaves the same for all frequencies $L_1$, $L_2$, and $L_5$, when measured in cycles but behaves differently for the different wavelengths $\lambda_1$, $\lambda_2$ and $\lambda_5$ when measured in units of distance), and multipath $\psi$.

From the above, the nondispersive term $\rho$ maps the same in each equation for all three frequencies, the dispersive term I maps as the square of the ratio of frequency to the $L_1$ frequency, the windup term maps linearly with a respective wavelength multiplier, and multipath maps with cyclical effect as a function of distance and reflectivity coefficient to the reflective surface.

Thus, all four contributions create different signatures in the received phase measurements. If one of the terms can be removed if known, then it is sufficient to guarantee the inversion of the remaining three unknowns if a sufficient time series is available.

For example, the multipath contribution is often small enough to ignore. If this contribution is set to zero, then there are three equations with three unknowns and these can be solved. Because the contributions all behave differently, they can all be distinguished from one another and each contribution can be determined from the three equations.

Therefore, the evolution of the windup or multipath may be followed without any knowledge of the state of the satellites' attitude (in the case of known multipath). Further, the evolution of multipath variations can be followed without any knowledge of the state of the satellite's attitude (when windup is known). This may occur if the desired attitude state is achieved with the attitude control system.

With these possibilities, the services that utilize the one-way measurements can enjoy potentially greater flexibility in that either no apriori knowledge of the attitude will be required, or those following the result of attitude controls will have an additional measurement of the effect of the applied controls. Multipath can also be followed if the impact of the controls is known and contributions are removed from the available three one-way phase measurements.

Thus, if the windup contribution includes the windup from the satellite and the receiver antennas, and if it is assumed that the attitude control system of the satellite is functioning properly, then the satellite's windup may be calculated. If the satellite's windup is known and calculated, the residual windup then represents only the windup of the receiver's antenna. Therefore, in one embodiment, the present invention can be used as a compass for the receiver's antenna (e.g., a receiver with antenna mounted on a ship, a receiver's antenna carried around by a surveyor, etc.).

Various embodiments are described below. An instrument that can measure three or more transmitted frequency signals (carriers) of a satellite, each measured to a small fraction of a cycle or equivalently in the order of millimeters in terms of distance, precisely monitors phase windup associated with transmission and reception without contamination from dispersive contributions (i.e., ionosphere) and nondispersive contributions (distance, clocks, troposphere, etc.) when there are no contaminating multipath effects. The recovered uncontaminated information about windup can be used to monitor the attitude of the transmitter (satellite, or any vehicle utilizing the same technology, like pseudolites for example) when orientation of the receiver antenna is known.

In another embodiment, an instrument that can measure three or more transmitted frequency signals (carriers) of a satellite, each measured to a small fraction of a cycle or equivalently to the order of millimeters in terms of distance, precisely monitors the nondispersive contributions (distance, clocks, troposphere, etc.) associated with their transmission and reception without contaminations from the windup and dispersive contributions when there are no contaminating multipath effects.

Further, the precise nondispersive, uncontaminated, derived contributions can be utilized as measurements for point positioning tasks on the earth's surface (including inside buildings and pseudolites) or in a vehicle navigating space (e.g., airplane, helicopter, airship, satellite, etc). Additionally, knowing the precise location of the receiving antenna, these derived nondispersive contributions can be used to estimate precise clock states or possibly differences in clock states.

An instrument that can measure three or more transmitted frequency signals (carriers) of a satellite, each measured to a small fraction of a cycle or equivalently to the order of millimeters in terms of distance, precisely monitors the dispersive contributions (e.g., ionosphere) associated with their transmission and reception without contamination from the nondispersive and windup contributions when there are no contaminating multipath effects. In one embodiment, these derived, uncontaminated, precise dispersive contributions can be utilized as measurements to map ionospheric activity. Further, when the equations are double differenced, the clock terms (in the $\rho$ term) are removed and the contribution from troposphere can be directly measured.

Utilizing derived estimates of all three quantities (epoch-to-epoch changes of dispersive, nondispersive, and windup effects), the receiver can determine whether a loss of lock (or cycle slip) has occurred based on assessing the reasonableness of the derived values when there are no contaminating multipath effects.

Since the pseudorange measurements do not exhibit any contribution due to windup, only the derived, precise nondispersive and dispersive contributions are needed to map the pseudorange measurements to other measurement times. The use of the three frequency relations allows for an uncontaminated averaging or smoothing of pseudoranges to take place when there are no contaminating multipath effects. Contaminating effects of multipath are typically reduced with long-term averaging.

In one embodiment, using the averaged or smoothed pseudoranges (e.g., the output of a recursive Bayes or Kalman filter or the output of a suboptimal filter), the initial conditions associated with the phase measurements can be obtained. An example is determining the fractional offset of widelane contributions. Once the initial conditions for dispersive and nondispersive values are obtained, the remaining windup offset condition can be determined using either of the three phase measurements. In one embodiment, spacecraft attitude conditions can be estimated using windup evolution and offset values.

Further, an estimate of multipath can be incorporated (rather than windup) when there are no contaminating windup effects due to their removal based on a knowledge of the satellite and receiving antennas' attitude. In one embodiment, assuming that the windup due to satellite attitude can be modeled, the estimated windup can be attributed to rotation of the receiving antenna. Any windup attributed to the receiver antenna can be interpreted as a change in horizontal orientation of the antenna (assuming the user continues to point the boresight axis upward). Having the precise estimation of the change in the horizontal orientation of the receiver's antenna, antenna corrections that are computed as a function of antenna azimuth and elevation relative to antenna orientation can be realized more accurately.

The horizontal change in orientation can be interpreted as a yaw rotation of the body carrying the GNSS antenna. This determination should be accurate to the order of a phase measurement uncertainty plus dilution of precision, which is at the order of 0.01 cycles. The determination of yaw, or equivalently the horizontal heading, can be used to compute optimal control actions so as to minimize time to destination, or any other metric that bases its decision on vehicle horizontal direction. As the receiving antenna's horizontal orientation is the same for all satellites tracked, then estimating the horizontal change as a common parameter among all satellites may improve the determination of this parameter. This can be done optimally or suboptimally.

In one embodiment, the number of unknown parameters can effectively be reduced to one per tracked satellite except for the first satellite. For example, if n satellites are tracked, then the first satellite's three phase measurements (or their differences in time) is a function of 4 unknowns (if no other information is available). For each additional satellite, then these additional satellites contribute only three more unknowns, each per set of three measurements of phase (each at a different frequency). Thus, for n satellites, the number of unknowns is $4+3(n-1)=3n+1$.

As satellites at very high elevations exhibit little (if any) multipath contamination, the number of unknowns can equal $3n+1-q$, where n is the number of satellites tracked, and q is the number of satellites where it can be assumed that multipath is essentially zero. When $q>0$, a sufficient number of measurements are present to solve for all unknowns, without any additional assumptions, other than the q assumptions of no multipath. If $q>1$, then there are more measurements than unknowns, thus allowing for a least-squares solution.

Additional degrees of freedom can be realized if some of the unknowns can be modeled as slowly changing parameters. This encompasses parameters that change so slowly that they can be modeled as constants. For example, if the heading offset and rate are known to be constant for a given time period, then the unknowns representing these heading parameters can be combined into only two unknowns over several epochs. This can improve the effectiveness of the estimation.

Expanding the nondispersive component to its individual components (e.g., position, clock state, or troposphere) can be beneficial if the expanded states cause a reduction in the total number of states needed over a period of time. For example, if the antenna is known to be stationary, the position terms remain unchanged until the antenna is moved. Likewise, if the clocks can be realized as slowly changing biases, or perhaps as an offset and slope term, then these states will be constant or slowly varying over some described time interval. Thus, any reparameterization using the original three-frequency relationships can occur. As a result, increases in degrees of freedom can be achieved by combining data from many satellites among more than one epoch, with possible reparameterizations. By increasing the degrees of freedom, parameters that do not fit the postulated mathematical model can be tested. For example, typical outlier detection or model inconsistency can be tested using statistical tests.

When the changes in dispersive and non-dispersive components are estimated precisely from GNSS phase measurements, then the same estimates can be used to correct pseudorange epoch-to-epoch variations. Changes in pseudorange multipath can then be estimated. Once estimated, these can be removed from the measured pseudorange changes. The observed pseudoranges can be corrected for both multipath changes epoch-to-epoch, and also the initial offset values. In one embodiment, reprocessing with multipath removed leads to iterative improvements in pseudorange smoothing.

Figure 5:
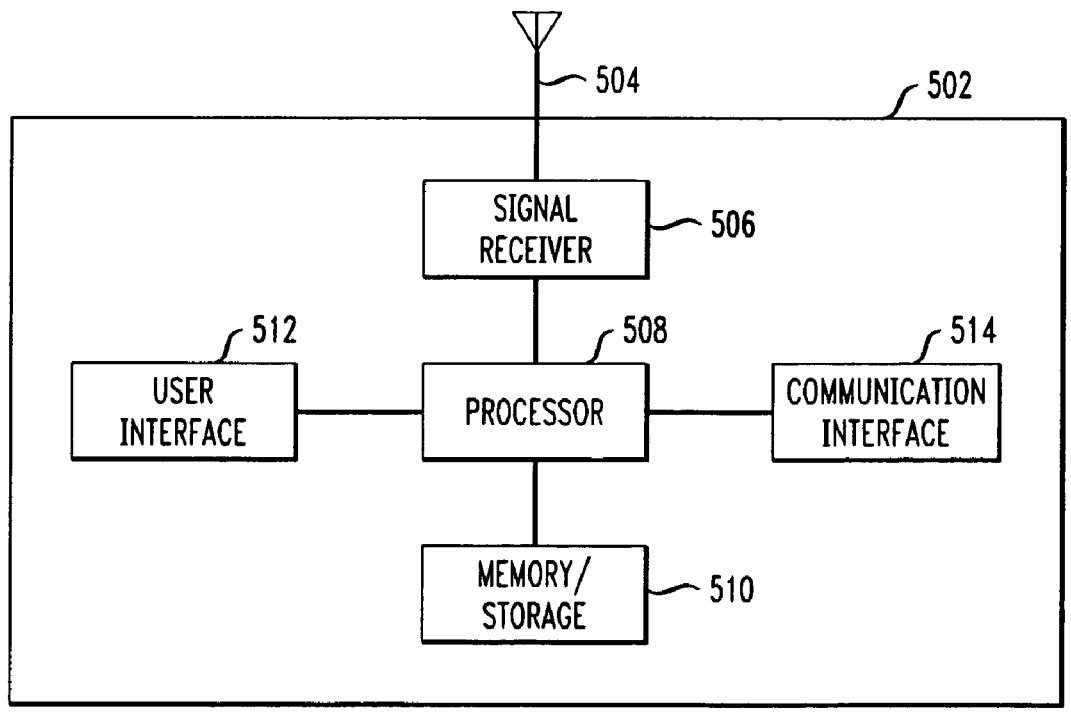
FIG. 5 is a high level block diagram of a receiver which may be used in an embodiment of the present invention.

A high level block diagram of the components of a receiver 502 is shown in FIG. 5. The receiver 502 includes at least one antenna 504 for receiving satellite signals from a constellation of visible navigation satellites. The signals are processed by a signal receiver 506 and the output of the signal receiver 506 may be provided to a processor 508 for further processing. The receiver 502 also includes a communication interface 514 for communicating with other devices via a communication channel. Receiver 502 may also contain user interface 512 elements (e.g., keypad, display, etc.) in order to allow interaction with a user of the receiver 502. The processor 508 controls the overall functioning of the receiver 502 under the control of computer program instructions stored in memory/storage 510. It is to be understood that FIG. 5 is meant to show a high level functional block diagram of a receiver for purposes of illustrating the principles of the present invention. There are, of course, other elements not shown which would be present in a receiver. Given the description herein, one skilled in the art would readily understand how to modify a well known receiver in order to implement the principles of the present invention.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A method of determining a rotation of a receiver, the method comprising:
   receiving at said receiver at least three signals from a satellite, each signal having a different frequency and a phase;
   generating at least three signals, each signal having a frequency corresponding to one of the frequencies of said at least three received signals and a phase;
   determining a phase difference between the phase of each received signal and said phase of each corresponding generated signal; and
   determining the rotation of the receiver based at least in part on the contribution of phase windup to each of said phase differences.

2. The method of claim 1 further comprising measuring said phase for each received signal.

3. The method of claim 1 further comprising determining whether a loss of lock with said satellite has occurred.

4. The method of claim 1 further comprising determining a rotation of said satellite based at least in part on the contribution of phase windup to each of said phase differences.

5. The method of claim 1 further comprising determining the contribution of dispersive elements to each of said phase differences.

6. The method of claim 5 wherein said determining the contribution of dispersive elements comprises determining components relating to ionosphere.

7. The method of claim 1 further comprising determining the contribution of nondispersive elements to each of said phase differences.

8. The method of claim 7 wherein said determining the contribution of nondispersive elements comprises determining components relating to at least one of position, clock state, and troposphere.

9. A receiver in communication with a satellite comprising:
   at least three antennas, each antenna configured to receive a signal from said satellite, each signal having a different frequency and a phase;
   an oscillator configured to generate at least three signals, each signal having a frequency corresponding to one of the frequencies of said at least three received signals and a phase; and
   a processor configured to determine a phase difference between the phase of each received signal and said phase of each generated signal and to determine a rotation of the receiver based at least in part on the contribution of phase windup to each of said phase differences.

10. The receiver of claim 9 wherein said processor is further configured to measure the phase for each received signal.

11. The receiver of claim 9 wherein said processor is further configured to determine a rotation of said satellite based at least in part of the contribution of phase windup to each of said phase differences.

12. The receiver of claim 9 wherein the processor is further configured to determine the contribution of dispersive elements to each of said phase differences.

13. The receiver of claim 12 wherein said dispersive elements comprise components relating to ionosphere.

14. The receiver of claim 9 wherein the processor is further configured to determine the contribution of nondispersive elements to each of said phase differences.

15. The receiver of claim 14 wherein said nondispersive elements comprise components relating to position, clock state, and troposphere.

16. The receiver of claim 15 wherein said processor is configured to determine contribution of at least one of said distance, said clock, and said troposphere after determining contribution of the other two of said distance, said clock and said troposphere.

17. A receiver in communication with a satellite comprising:
   means for receiving at least three signals from said satellite, each signal having a different frequency and a phase;
   means for generating at least three signals, each signal having a frequency corresponding to one of the frequencies of said at least three received signals and a phase;
   means for determining a phase difference between the phase of each received signal and said phase of each generated signal; and
   means for determining a rotation of the receiver based at least in part on the contribution of phase windup to each of said phase differences.

18. The receiver of claim 17 further comprising means for measuring said phase for each received signal.

19. The receiver of claim 17 further comprising means for determining whether a loss of lock with said satellite has occurred.

20. The receiver of claim 17 further comprising means for determining a rotation of said satellite based at least in part on the contribution of phase windup to each of said phase differences.

21. The receiver of claim 17 further comprising means for determining the contribution of dispersive elements to each of said phase differences.

22. The receiver of claim 21 wherein said means for determining the contribution of dispersive elements further comprise means for determining components relating to ionosphere.

23. The receiver of claim 17 further comprising means for determining the contribution of nondispersive elements to each of said phase differences.

24. The receiver of claim 23 wherein said means for determining the contribution of nondispersive elements further comprises means for determining components relating to at least one of position, clock state, and troposphere.

* * * * *

UNITED STATES PATENT AND TRADEMARK OFFICE
CERTIFICATE OF CORRECTION

PATENT NO. : 7,737,889 B1  Page 1 of 1
APPLICATION NO. : 11/473354
DATED : June 15, 2010
INVENTOR(S) : Clyde C. Goad It is certified that error appears in the above-identified patent and that said Letters Patent is hereby corrected as shown below:

Column 5, line 34, "$d = \hat{X} - k(k \cdot \hat{X} + k \times \hat{X})$" should read -- $d = \hat{x} - k(k \cdot \hat{x} + k \times \hat{y})$ --

Column 5, line 35, "$d' = \hat{X}' - k(k \cdot \hat{X}') + k \times \hat{X}'$" should read -- $d' = \hat{x}' - k(k \cdot \hat{x}') + k \times \hat{y}'$ --

Column 5, line 44, "$\hat{x}$ and $\hat{x}$" should read -- $\hat{x}$ and $\hat{y}$ --

Column 7, line 19, "receives" should read --received--

Column 7, line 45, "$\Delta\Phi_{k,5}^p \pm \Delta\hat{\rho}_k^p(\hat{t}^p) - \lambda_5 \Delta\Gamma I_{k,1,\phi}^p(t_k) + \lambda_5 \Delta\delta\Phi_k^p + \lambda_5 \Delta\psi(\lambda_5) + \lambda_5 \Delta\varepsilon_{1,\phi}$"
should read -- $\Delta\Phi_{k,5}^p = \Delta\hat{\rho}_k^p(\hat{t}^p) - \lambda_5 \Delta\Gamma I_{k,1,\varphi}^p(t_k) + \lambda_5 \Delta\delta\Phi_k^p + \lambda_5 \Delta\psi(\lambda_5) + \lambda_5 \Delta\varepsilon_{1,\varphi}$ --

Column 7, line 53, "$\Delta\Phi_{k,5}^p \pm \Delta\hat{\rho}_k^p(\hat{t}^p) - \lambda_5 \Delta\Gamma I_{k,1,\phi}^p(t_k) + \lambda_5 \Delta\delta\Phi_k^p + \lambda_5 \Delta\psi(\lambda_5)$" should read
-- $\Delta\Phi_{k,5}^p = \Delta\hat{\rho}_k^p(\hat{t}^p) - \lambda_5 \Delta\Gamma I_{k,1,\varphi}^p(t_k) + \lambda_5 \Delta\delta\Phi_k^p + \lambda_5 \Delta\psi(\lambda_5)$ --

Column 9, line 55, "antenna azimuth" should read --satellite azimuth--

Column 10, line 31, "to" should read --into--

Signed and Sealed this

Thirty-first Day of August, 2010

David J. Kappos
*Director of the United States Patent and Trademark Office*